US010216720B2

(12) United States Patent
Buchanan et al.

(10) Patent No.: US 10,216,720 B2
(45) Date of Patent: Feb. 26, 2019

(54) COMPARATOR ASSOCIATED WITH DICTIONARY ENTRY

(71) Applicant: Hewlett Packard Enterprise Development LP, Houston, TX (US)

(72) Inventors: Brent Buchanan, Fort Collins, CO (US); Le Zheng, Palo Alto, CA (US); John Paul Strachan, San Carlos, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/336,907

(22) Filed: Oct. 28, 2016

(65) Prior Publication Data

US 2018/0121416 A1 May 3, 2018

(51) Int. Cl.
*G06F 17/27* (2006.01)

(52) U.S. Cl.
CPC ................................ *G06F 17/2735* (2013.01)

(58) Field of Classification Search
USPC ........................................................ 704/9, 10
See application file for complete search history.

(56) References Cited

U.S. PATENT DOCUMENTS 5,893,137 A 4/1999 Parks et al.
6,987,683 B2 1/2006 Ao
2004/0120174 A1* 6/2004 Regev .................... G11C 15/00 365/49.1
2005/0010719 A1* 1/2005 Slavin .................... G11C 15/00 711/108
2005/0083718 A1* 4/2005 Lysinger ................ G06F 7/026 365/49.1
2007/0206599 A1 9/2007 Bhalala et al.
2008/0043507 A1* 2/2008 Srinivasan ............... G11C 7/02 365/49.1
2015/0332767 A1* 11/2015 Arsovski .............. G11C 11/417 365/49.17

FOREIGN PATENT DOCUMENTS

CN 204087808 1/2015

OTHER PUBLICATIONS

Govindaraj, R. et al., An Efficient Technique for Longest Prefix Matching in Network Routers, (Research Paper), 2012, 5 Pgs.
Panigrahy, R. et al., Sorting and Searching Using Ternary CAMS, (Research Paper), 2003, 10 Pgs.
Ullah, Z. et al., E-TCAM: An Efficient SRAM-Based Architecture for TCAM, (Research Paper), May 13, 2014, 22 Pgs.

* cited by examiner

*Primary Examiner* — Leonard Saint Cyr
(74) *Attorney, Agent, or Firm* — Michael A. Dryja

(57) ABSTRACT

Comparators may be associated with dictionary entries. In one aspect, a dictionary entry may store a dictionary word. A register may store an input word. A comparator associated with the dictionary entry may compare the dictionary word and the input word. The comparison may be a bit by bit comparison. The comparator may output a signal indicating if the dictionary word is less than the input word, equal to the input word, or greater than the input word. The output may indicate indeterminate when the comparison is not yet complete.

20 Claims, 4 Drawing Sheets

COMPARATOR TRUTH TABLE

| CURRENT OUTPUT | LEAST SIGNIFICANT BIT | COMPARISON RESULT | NEW OUTPUT |
|---|---|---|---|
| NOT INDETERMINATE | DON'T CARE | DON'T CARE | NO CHANGE |
| INDETERMINATE | DON'T CARE | GREATER | GREATER |
| INDETERMINATE | DON'T CARE | LESS | LESS |
| INDETERMINATE | NO | EQUAL | INDETERMINATE |
| INDETERMINATE | YES | EQUAL | EQUAL |

| CURRENT OUTPUT | LEAST SIGNIFICANT BIT | COMPARISON RESULT | NEW OUTPUT |
|---|---|---|---|
| NOT INDETERMINATE | DON'T CARE | DON'T CARE | NO CHANGE |
| INDETERMINATE | DON'T CARE | GREATER | GREATER |
| INDETERMINATE | DON'T CARE | LESS | LESS |
| INDETERMINATE | NO | EQUAL | INDETERMINATE |
| INDETERMINATE | YES | EQUAL | EQUAL |

COMPARATOR ASSOCIATED WITH DICTIONARY ENTRY

BACKGROUND

In a standard memory, a memory address is input, and the contents stored at that address are output. In a content addressable memory (CAM), the input is the desired content. The output is an indication of each memory address that contains the desired content. Content addressable memory is useful in many different applications, such as translation lookaside buffers, for example.

The CAM may include a plurality of dictionary entries whose content can be referred to as dictionary words. The content addressable memory may receive an input word, which contains the content that is desired to be found in the CAM. The CAM may then search the dictionary words to find all entries that contain the input word. An indication of all matching dictionary entries may then be returned.

In a CAM, all memory cells that comprise dictionary entry may be connected to a match line for that dictionary entry. The match line may be initially pre-charged. Each memory cell is then compared to its corresponding bit position in the input word. If a bit cell does not match, it causes the match line to discharge. As should be clear, if any bit cell does not match, the match line will be discharged. At the end of this operation, if the match line for the dictionary entry is still charged, the dictionary word contained in the dictionary entry matches the input word, otherwise, it does not. In general, all dictionary entries are compared to the input word in parallel.

DETAILED DESCRIPTION

The CAM structure described above does an excellent job of determining if a dictionary entry matches or does not match an input word. However, the binary match/no match output, while useful in some applications, is not helpful in other applications, such as sorting. For example, it may be desirable to know if a particular dictionary word is less than, equal to, or greater than the input word. Such knowledge would be useful in sorting applications.

The techniques described herein provide for a sorting CAM like structure. The sorting CAM like structure may include a set of dictionary entries, just like a CAM. Each dictionary entry may be coupled to a comparator. The comparator may be used to output a signal that indicates if the input word is less than, equal to, or greater than the dictionary word stored in the dictionary entry. Just as in a CAM, the sorting CAM like structure processes all dictionary entries in parallel.

The techniques described allow for the comparison to be done in a time that is proportional to the size of the dictionary entry, and is not dependent on how many dictionary entries there are. For example, a dictionary entry may have a size that is equivalent to the word size of the system it is being implemented on (e.g. 32 bits, 64 bits, etc.). The amount of time needed to perform the comparison is proportional to the number of bits stored for each dictionary entry. The upper bound of this time remains constant, regardless of how many dictionary entries are included the sorting CAM like structure. Upper bounded time limit may be useful as compared to other sorting processes whose completion time may be dependent on the total number of entries stored.

Figure 1:
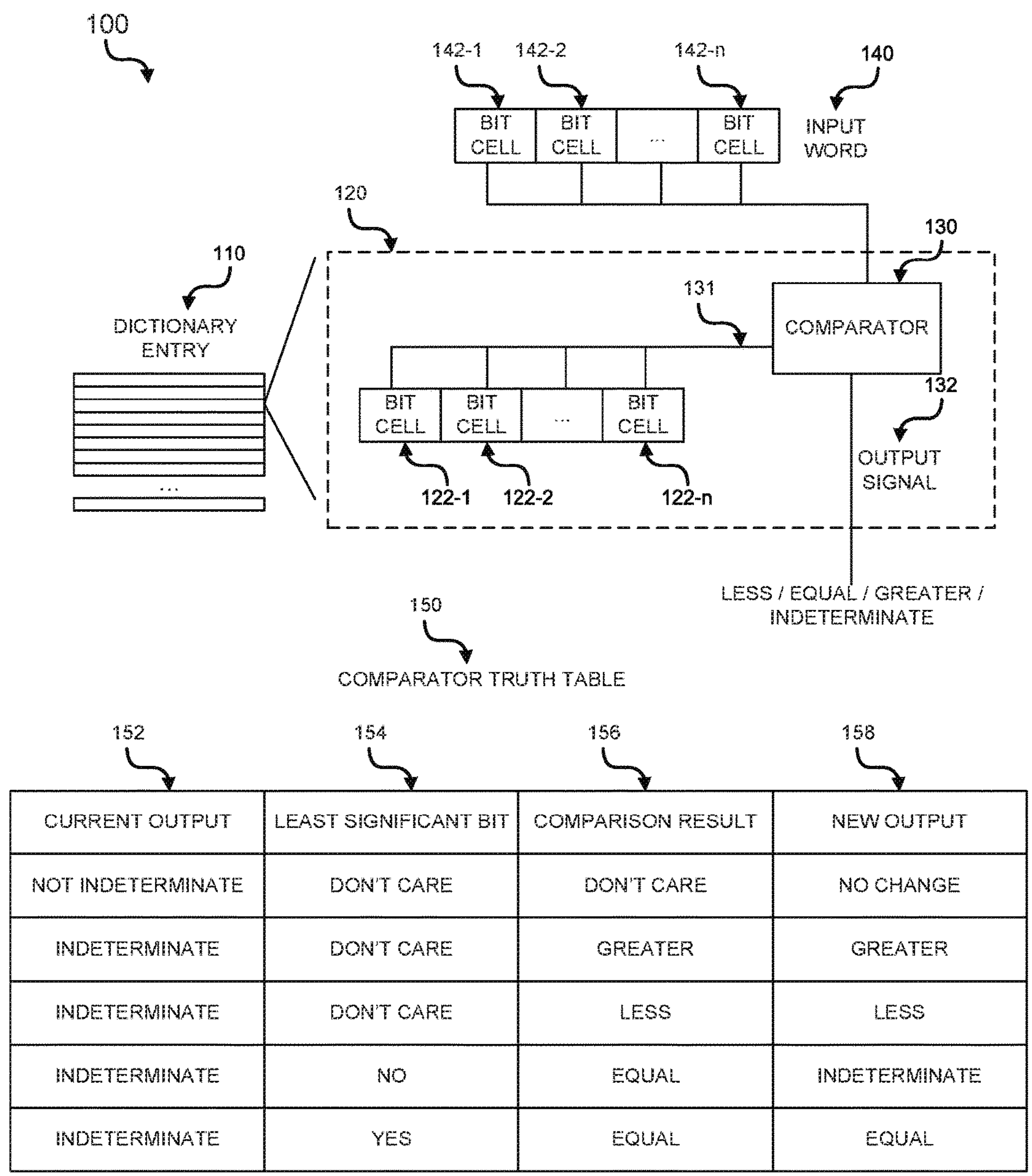
FIG. 1 is an example of a circuit that may implement the comparator associated with dictionary entry techniques described herein.

FIG. 1 is an example of a circuit that may implement the comparator associated with dictionary entry techniques described herein. System 100 may include a CAM like structure 110, which includes a plurality of dictionary entries. The structure 110 may be referred to as a sorting CAM like structure. For ease of description, only a single dictionary entry 120 is shown. The dictionary entry may include a plurality of bit cells 122-(1 . . . *n*). Each bit cell may store a single bit of a dictionary word stored in the dictionary entry. The bit cells may be ordered from a most significant bit (MSB) to a least significant bit (LSB). For purposes of this description, the MSB will be considered bit 122-1. However, it should be understood that the techniques described herein are not limited to that particular layout.

The dictionary entry may also include a comparator 130. The techniques described herein are not limited to any particular comparator implementation. The comparator may be implemented in hardware as logic, such as discrete logic, a programmable logic device (PLD), a field programmable gate array (FPGA), an application specific instruction circuit (ASIC), or any other suitable hardware implementation. The particular implementation of the comparator is unimportant. Rather it should be understood that any circuit capable of executing the functionality described below, including the comparator truth table 150, would be suitable for use with the techniques described herein. The comparator may be coupled 131 to the plurality of bit cells 122. The comparator may also be coupled to an input word 140. The input word may also include a plurality of bit cells 142-(1 . . . *n*). Again, each bit cell may store a single bit of the input word. The bit cells may be ordered in a MSB to LSB order that aligns with the order of bit cells 122. It should be noted that the techniques described herein are not limited to input words or dictionary words of any particular size. In some implementations, the input words and dictionary entries may align to the word size (e.g. 32 bits, 64 bits) of the system in which the techniques described herein are being implemented.

The comparator may also include an output signal 132. The output signal may indicate the result of the comparison of the dictionary word stored in the dictionary entry and the input word. The output signal may take on the values such as GREATER, EQUAL, or LESS to indicate if the input word is greater than, equal to, or less than the dictionary word. It should be understood that this ordering is for purposes of explanation and that the order of comparison could be reversed. For example, the output signal may indicate if the dictionary word is greater than, equal to, or less than the input word.

In operation, the comparator may start at the MSB bit cell of the dictionary word 120 and the input word 140 and compare the values. The comparator may then set the output signal based on comparator truth table 150 described below. The comparator may then shift one bit to the right in both the dictionary entry and the input word and repeat the comparison, again conforming to the truth table 150. This process may continue until the LSB is reached. The comparison may be repeated. At this point, the output signal may indicate if the input word is greater than, equal to, or less than the dictionary word (or vice versa, as explained above).

The comparator truth table 150 describes the behavior of comparator 130. The first column 152 indicates the current output. The current output has two general values. First is NOT INDETERMIATE (e.g. GREATER, LESS, EQUAL) or indeterminate, meaning that the result of the comparison is not yet known, and additional bits must be compared. The second column 154 indicates if the current bit being compared is the least significant bit. In the table, the possible values are YES, NO, and DON'T CARE, wherein DON'T care indicates the value has no impact on the output. The third column 156 is the result of the comparison. The possible values are GREATER, LESS, EQUAL, or DON'T CARE, where again DON'T CARE has no impact on the output.

The comparator may compare the MSB of the input word to the dictionary word and set the output signal 132 according to the truth table 150. The comparator may then shift to the next bit and the process may continue.

According to the second row of the truth table 150, if the current output is not indeterminate, which means that it has already been determined if the input word is greater than the dictionary word, then it does not matter if this is the LSB or what the result of the comparison is. There will be no change to the output signal. The reason for this is that once the relationship between the input word and dictionary word has been determined, there is no need to examine the result of the comparison of any more bits, as those bit comparisons cannot possible impact the result of the comparison of the input word and the dictionary word.

In the third row of the truth table 150, it is shown that if the current output is indeterminate, if the comparison result is that the current bit of the input word is greater than the dictionary word, then the input word is greater than the dictionary word. This is reflected in the new output signal being set to greater. It should be noted that it does not matter if this is the LSB or not, because that is a don't care condition.

In the fourth row, there is the opposite condition of the third row, in which the comparison indicates that the current bit of the input word is less than the dictionary word. Here, the new output is set to less than the dictionary word. Again, it does not matter if this is the LSB or not.

In the fifth row of the truth table 150, if the current output is indeterminate, and this is not the LSB, and the values are equal, then the new output remains indeterminate. The reason for this is that under this set of conditions, the input word and the dictionary word are equal for the current and all prior bits. Had they not been equal, one of the previous entries in the truth table would have set the output value to something other than indeterminate. However, since that is not the case, the output value cannot yet be set, because there are still more bits remaining to be compared.

The sixth row of truth table 150 indicates that if the current output is indeterminate, and this is the LSB, and the comparison is equal, then the new output is set to equal, indicating the input word and the dictionary word are the same. The reason for this is that if they were different (e.g. one is greater than the other), the previous truth table entries would have set the output value to greater than or equal. At this point, all bits are equal, and there are no more bits to compare (as indicated by the LSB entry being set to yes). Thus, the only possibility is that the input word and the dictionary word are equal.

Figure 2A:
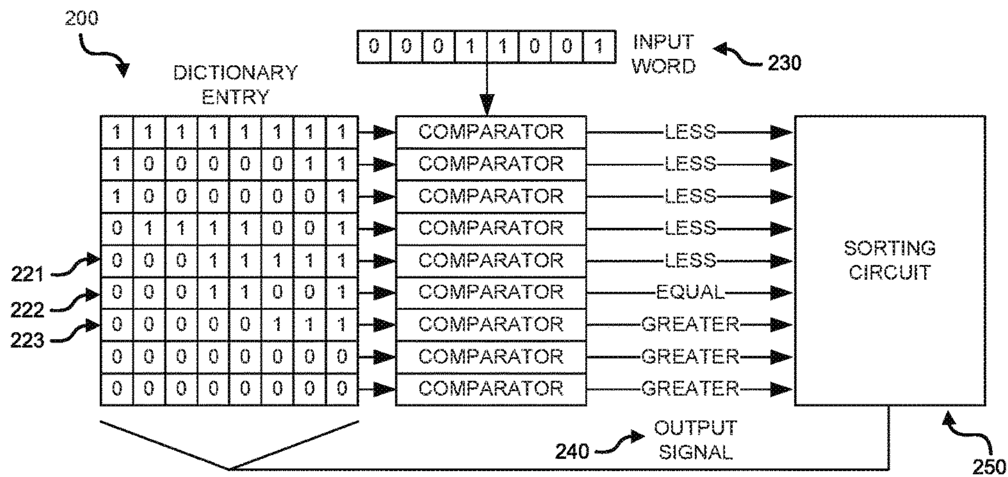
FIGS. 2(A-C) are an example of a sorting circuit that may utilize the comparator associated with dictionary entry techniques described herein.

FIGS. 2(A-C) are an example of a sorting circuit that may utilize the comparator associated with dictionary entry techniques described herein. FIG. 2A depicts a sorting CAM structure like structure 200. As shown, the structure includes 9 dictionary entries, each of those dictionary entries storing a dictionary word. For example, dictionary entry 221 stores the dictionary word 00011111, dictionary entry 222 stores the dictionary word 00011001, and dictionary entry 223 stores the dictionary word 00000111. For purposes of this example, it is assumed that the dictionary entries are currently sorted from largest to smallest, as shown. Each dictionary entry is coupled with a comparator. Operation of the comparator is described above with respect to FIG. 1.

In operation, an input word 230 may be received. In the present example, the received input word is 00011001. The comparators may perform a bit by bit comparison of the input word to each of the dictionary words stored in the dictionary entries. The comparison may be performed using the procedure described above with respect to FIG. 1. At the end of the comparison, each comparator may set an output signal 240 which indicates if the input word is less than, equal to, or greater than the dictionary word stored in the dictionary entry associated with the comparator.

The output may be sent to a sorting circuit 250. The particular implementation of the sorting circuit is unimportant. The sorting circuit may be implemented in hardware as logic, such as discrete logic, a programmable logic device (PLD), a field programmable gate array (FPGA), an application specific instruction circuit (ASIC), or any other suitable hardware implementation. The sorting circuit may also be implemented as a series of processor executable instructions, which when executed by a processor, cause the process to provide the functionality that is described below.

Because the sorting CAM like structure 200 is initially sorted, the proper placement of the input word in the structure is readily apparent. The input word should be placed after all dictionary words where the input word is less than the dictionary word, but before all dictionary words where the input word is greater than the dictionary word. In the case of a dictionary word that is equal to the input word, the convention for the instant example will be to insert the input word after the last dictionary entry indicated as equal. As shown in FIG. 2A, the input word is less than dictionary entry 221, and should be placed after that entry. The input word is equal to dictionary entry 222, and based on the assumed convention for this example, the input word should be placed after dictionary entry 222. The input word is greater than the dictionary entry 223 and thus the input word should be placed before the dictionary entry 223.

Figure 2B:
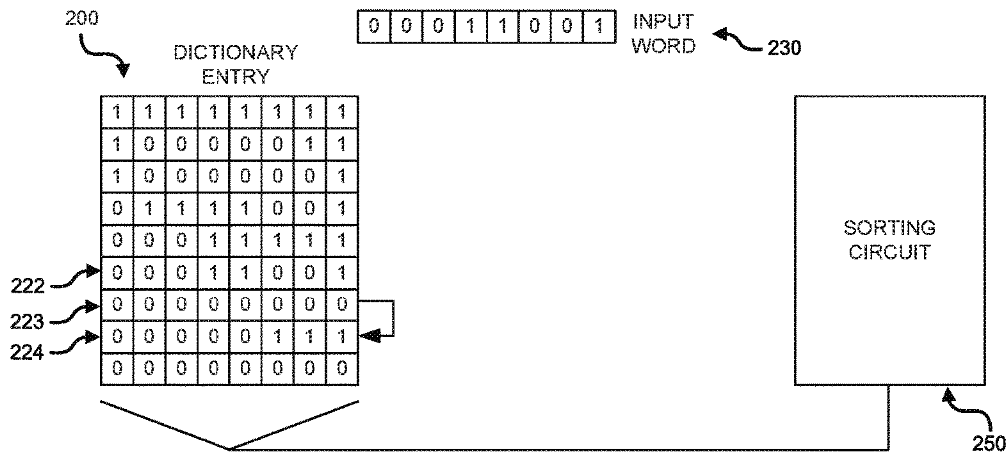
Figure 2C:
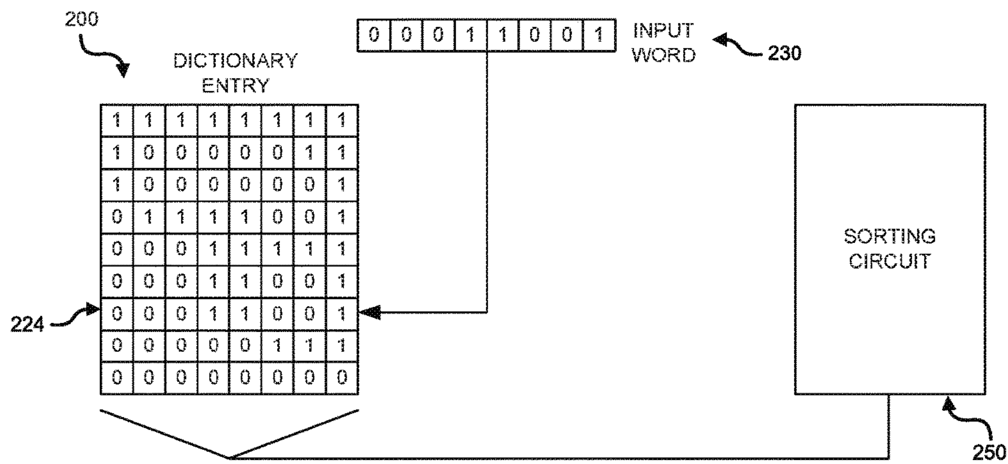

In order to make space for insertion of the input word into the sorting CAM like structure, 200, the currently stored dictionary words may be shifted by the sorting circuit to make space. For example, as shown in FIG. 2B, the contents of dictionary entry 223 are shifted down to dictionary entry 224. Although not shown, it should be understood that had dictionary entry 224 stored an actual value (other than 00000000) those contents would have also been shifted to the next entry. What should be understood is that a space is created within the structure 200 by shifting the entries. In FIG. 2C, the input word 230 may then be inserted into the space created in dictionary entry 223. As should be clear, by following the procedure outlined above, the sorting CAM like structure 200 remains sorted.

Although FIGS. 2(A-C) depict one possible implementation of a CAM like sorting structure, many other implementations are possible. For example, in an alternate implementation, rather than the CAM like structure itself being sorted, a separate structure may be maintained which indicates the sorted order of the dictionary entries. In yet another possible implementation, a short key may be generated and appended to the dictionary entry (e.g. indicating the dictionary entry is the $x^{th}$ largest entry).

Although there are many possible sorting circuits that may be used, what should be understood is that the techniques described herein allow for comparison of all dictionary entries to the input word in a deterministic time period (e.g. a number of cycles equivalent to the number of bits stored in a dictionary entry). The time period remains constant, regardless of the number of dictionary entries.

Figure 3:
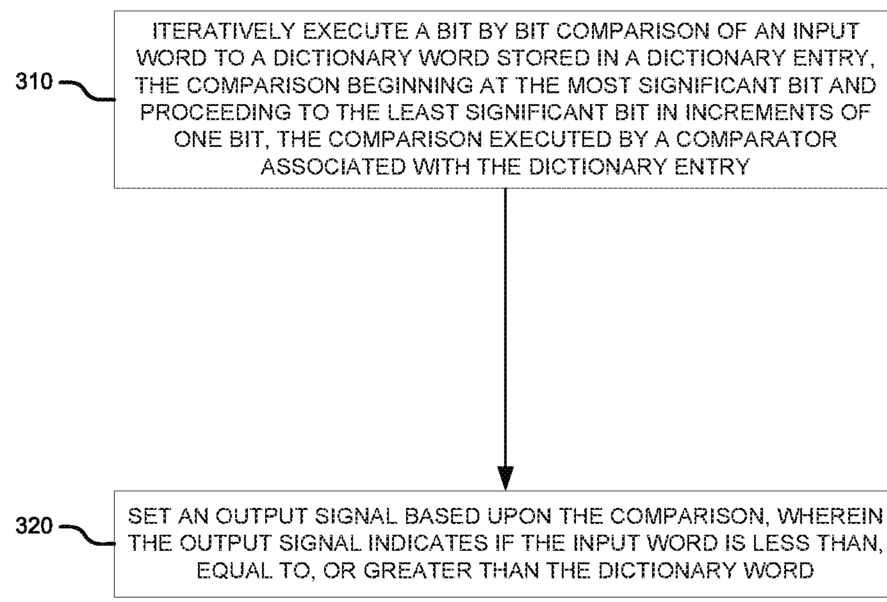
FIG. 3 is an example of a high level flow diagram of a circuit that may implement comparator associated with dictionary entry techniques described herein.

FIG. 3 is an example of a high level flow diagram of a circuit that may implement comparator associated with dictionary entry techniques described herein. In block 310, an iterative bit by bit comparison of an input word to a dictionary word stored in a dictionary entry may be executed. The comparison may begin at the most significant bit and proceed to the least significant bit in increments of one bit. The comparison may be executed by a comparator associated with the dictionary entry.

As explained above, each dictionary entry may be associated with a comparator. For each dictionary entry, the comparator may step through each bit of the dictionary word stored in that entry, proceeding from the most significant bit to the least significant bit (e.g. from left to right). The comparator may compare the bit of the dictionary word with the corresponding bit of the input word. As should be clear, this comparison may occur for all dictionary entries in parallel, because each dictionary entry may be associated with its own comparator.

In block 320, an output signal may be set based upon the comparison. The output signal may indicate if the input word is less than, equal to, or greater than the dictionary word. In other words, it may be determined which dictionary entries are less than, greater than, or equal to the input word. This determination may occur for all dictionary entries in parallel. Furthermore, as explained above, the time required for the comparison remains fixed, and is not dependent on the number of total dictionary entries, but rather is determined by the number of bits in the dictionary entries.

Figure 4:
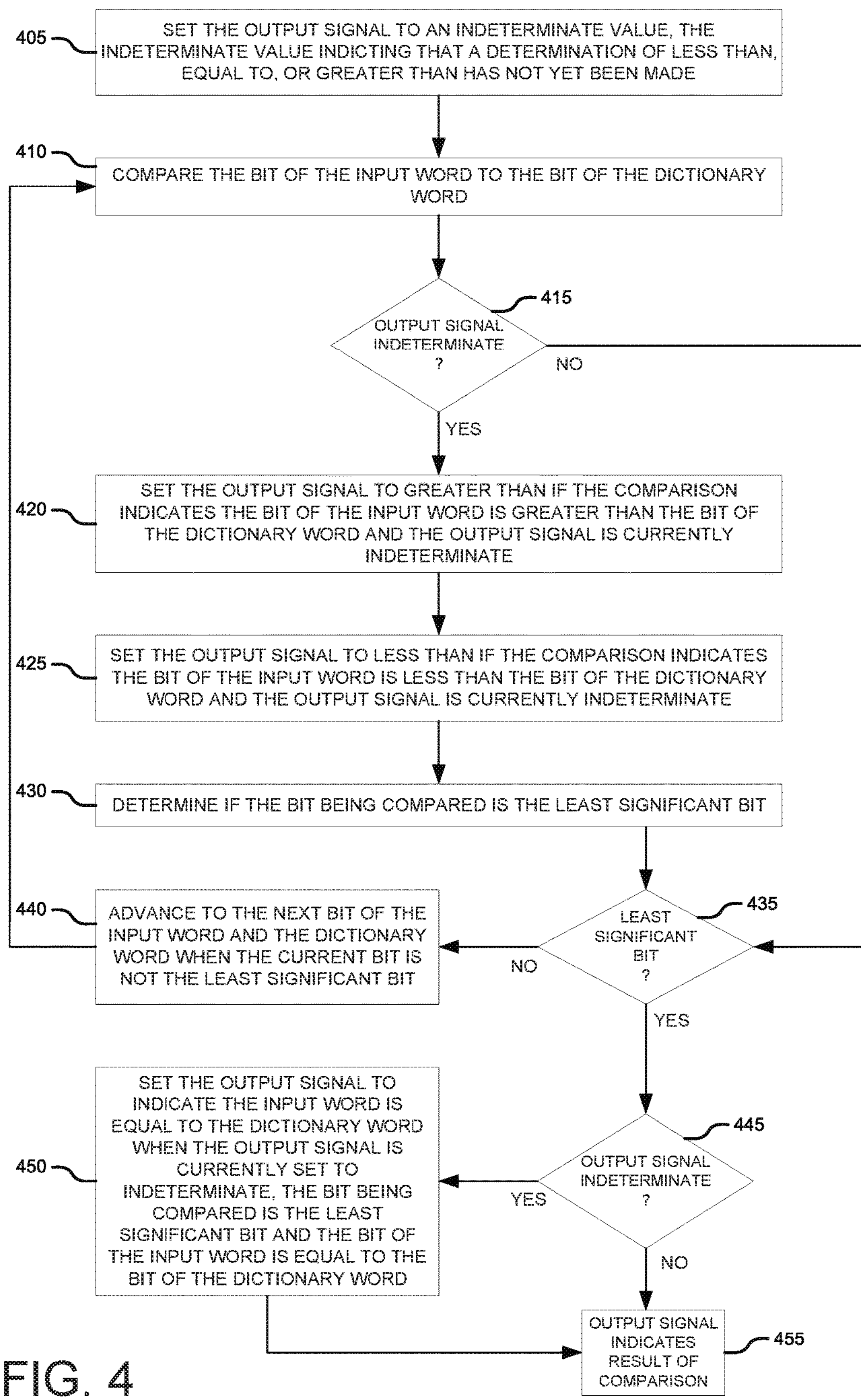
FIG. 4 is another example of a high level flow diagram of a circuit that may implement comparator associated with dictionary entry techniques described herein.

FIG. 4 is another example of a high level flow diagram of a circuit that may implement comparator associated with dictionary entry techniques described herein. In block 405, the output signal may be set to an indeterminate value. The indeterminate value may indicate that a determination of less than, equal to, or greater than has not yet been made. In other words, prior to beginning the comparison, the output value may be set to indicate that the result of the comparison is not yet known.

In block 410, the bit of the input word may be compared to the bit of the dictionary word. As explained above, for each dictionary entry, a bit by bit comparison is made between the input word and the dictionary word stored in the dictionary entry. Depending on the results of the comparison, a determination may be made as to if the input word is greater than, less than, or equal to the dictionary word. This process is described in further detail below.

In block 415, it may be determined if the output signal is set to indeterminate. If the output signal is not set to indeterminate, the process moves to block 435, which will be described in further detail below. If the output signal is set to indeterminate, the process moves to block 420. In other words, in block 415 it is determined if the result of the comparison (e.g. less than, greater than, or equal to) is already known. If not, the process moves to block 420.

In block 420, the output signal may be set to greater than if the comparison indicates the bit of the input word is greater than the bit of the dictionary word and the output is currently indeterminate. In other words, because the comparison occurs from most significant bit to least significant bit, if the current bit of the input word is greater than the current bit of the dictionary word, the input word must be greater than the dictionary word. This must be true because otherwise the output signal could not still be indeterminate.

In block 425, the output signal may be set to less than if the comparison indicates the bit of the input word is less than the bit of the dictionary word and the output is currently indeterminate. In other words, because the comparison occurs from most significant bit to least significant bit, if the current bit of the input word is less than the current bit of the dictionary word, the input word must be less than the dictionary word. This must be true because otherwise the output signal could not still be indeterminate.

In block 430, it may be determined if the bit being compared is the least significant bit. Because the comparison proceeds from most significant bit to least significant bit (e.g. left to right), at some point the rightmost bit (e.g. the least significant bit) will be compared.

In block 435, if it is determined that the bit being compared is the least significant bit, the process moves to block 445, which will be described in further detail below. If it is determined that the bit being compare is not the least significant bit, the process moves to block 440. In other words, if there are still more bits to compare, the process moves to block 440. It should be noted that block 435 may also be reached from block 415, in which the output signal has already been determined to not be indeterminate (e.g. it is already known if the input word is greater than or less than the dictionary word).

In some implementations, once the result of the comparison has been determined, there is no need to continue comparison for the remaining bits. As such, once it is determined in block 415 that the output signal is not indeterminate, the process could move immediately to block 455 (described below). However, such an implementation may be slightly more complex, as completion of the comparison process may take a different number of cycles depending on the stored values. For example, assume two dictionary entries, where the first dictionary word is larger than the input word based on comparison of the first bit, while the second dictionary word is equal to the input word. Comparison of the first bit (e.g. 1 cycle) would determine that the first dictionary word is larger.

However, it may take a number of cycles equal to the length of the dictionary word (e.g. 32 cycles, 64 cycles) to determine that the second dictionary work and the input word are equal. The implementation described in FIG. 4 provides a consistent timing for the comparison that is proportional to the length of the dictionary words, at the expense of checking bits of dictionary words that have already been determined to be greater than or less than the input word.

In block 440, the process may advance to the next bit of the input word and the dictionary word when the current bit is not the least significant bit. In other words, the bit being compared is shifted in a one bit increment from the current bit to the next bit, moving in the direction of decreasing bit significance (e.g. from left to right). The process may then move to block 410, which was described above. It should be noted that if the output signal had been set in blocks 420 or 425, upon return to block 410, the process moves to block 415. Regardless of the result of the comparison in block 410, the process moves to block 435 because the output signal is no longer indeterminate.

If it is determined in block 435 that the current bit is the least significant bit, the process moves to block 445. In block 445, it may be determined if the output signal is indeterminate. If the output signal is indeterminate, the process moves to block 450, described below. If the output signal is not indeterminate, the process moves to block 455, in which the output signal indicates the results of the comparison (e.g. less than, equal to, or greater than) between the input word and the dictionary word.

In block 450 the output signal may be set to indicate the input word is equal to the dictionary word when the output signal is currently set to indeterminate, the bit being compared is the least significant bit, and the bit of the input word is equal to the bit of the dictionary word. In other words, if the comparison is currently looking at the last bit of the input word, and it has not yet been determined that the input word is greater than or less than the dictionary word, the only remaining possibility is that the input word and the dictionary word are equal. The process may then move to block 455, which has been described above.

We claim:

1. A circuit comprising:

a dictionary entry storing a dictionary word;

a register storing an input word; and a hardware comparator associated with the dictionary entry to compare the dictionary word and the input word, based on a bit-by-bit comparison, the comparator having an output line on which to output a signal as the bit-by-bit comparison occurs, the signal indicating if the dictionary word is, based on a number of bits that the hardware comparator has thus far compared, less than the input word, equal to the input word, greater than the input word, or indeterminate, wherein indeterminate means the comparison is not yet complete, wherein the circuit is a sorting circuit is to sort a plurality of dictionary words including the dictionary word stored by the dictionary entry by utilizing a content-addressable memory that indicates whether the dictionary word is greater than or less than the input word when adding the input word to a sorted order of the dictionary words, including determining a location of the input word stored by the register within the sorted order of the dictionary words in a length of time having an upper-bounded limit irrespective of a number of the dictionary words.

2. The circuit of claim 1 wherein the comparator is further to:

iteratively compare each bit of the dictionary word with a corresponding bit of the input word to determine if the dictionary word is smaller, equal to, or greater than the input word, the comparison proceeding from a most significant bit to a least significant bit of the dictionary word.

3. The circuit of claim 2 further comprising:

setting the output signal based on the comparison.

4. The circuit of claim 3 wherein setting the output signal further comprises:

setting the output signal to its current value when the output signal is not currently set to indeterminate.

5. The circuit of claim 3 wherein setting the output signal further comprises:

setting the output signal to indicate the dictionary word and the input word are equal when the comparison indicates the bits being compared are equal and the current bit being compared is the least significant bit of the dictionary word.

6. The circuit of claim 3 wherein setting the output signal further comprises:

setting the output signal to indeterminate when the comparison indicates the bits being compared are equal, the current bit being compared is not the least significant bit of the dictionary word, and the output signal is currently set to indeterminate.

7. The circuit of claim 3 wherein setting the output signal further comprises:

setting the output signal to indicate the dictionary word is greater than the input word when the comparison indicates the bit of the dictionary word being compared is greater than the bit of the input word and the output signal is currently set to indeterminate.

8. The circuit of claim 3 wherein setting the output signal further comprises:

setting the output signal to indicate the dictionary word is less than the input word when the comparison indicates the bit of the dictionary word being compared is less than the bit of the input word and the output signal is currently set to indeterminate.

9. The circuit of claim 1 comprising a plurality of dictionary entries, each dictionary entry of the plurality of dictionary entries associated with a comparator of a plurality of comparators.

10. The circuit of claim 1 wherein the upper-bounded limit is proportional to the size of the dictionary entry.

11. A sorting circuit comprising:

a plurality of dictionary entries storing a plurality of dictionary words;

a plurality of hardware comparators, each comparator associated with one dictionary entry of the plurality of dictionary entries, each comparator to indicate if the associated dictionary entry is less than, equal to, or greater than an input word;

a plurality of circuits, each circuit comprising one of the dictionary entries and the comparator to which the one of the dictionary entries corresponds;

a sorting logic to determine a sorted position of the input word; and an insertion circuit to insert the input word into an empty dictionary entry, wherein the sorting circuit is to sort the dictionary words stored by the dictionary entry by utilizing a content-addressable memory that indicates whether the dictionary word stored by dictionary entry is greater than or less than the input word when adding the input word in addition to indicating whether the dictionary word is equal to the input word when adding the input word to a sorted order of the dictionary words, including determining a location of the input word stored by the register within the sorted order of the dictionary words in a deterministic length of time irrespective of a number of the dictionary words.

12. The sorting circuit of claim 11 wherein the insertion circuit is further to:

create the dictionary entry, as an empty dictionary entry, at the determined sorted position by shifting the dictionary words.

13. The sorting circuit of claim 11 wherein the insertion circuit is further to:

append a key to the input word, the key indicating the sorted position of the input word.

14. The sorting circuit of claim 11 wherein the deterministic time is constant regardless of a number of the dictionary entries.

15. A method comprising:

iteratively executing, by a circuit including a dictionary entry storing a dictionary word, a register storing an input word, and a hardware comparator, a bit-by-bit comparison of the input word to the dictionary word, the comparison beginning at the most significant bit and proceeding to the least significant bit in increments of one bit, the comparison executed by the comparator; and as the bit-by-bit comparison occurs, providing an output signal on an output line of the circuit based on a number of bits that the hardware comparator has thus far compared, wherein the output signal indicates if the input word is less than, equal to, or greater than the dictionary word, or if a determination of less than, equal to, or greater than has not yet been made, wherein the circuit is a sorting circuit is to sort a plurality of dictionary words including the dictionary word stored by the dictionary entry by utilizing a content-addressable memory that indicates whether the dictionary word is greater than or less than the input word when adding the input word to a sorted order of the dictionary words, including determining a location of the input word stored by the register within the sorted order of the dictionary words in a length of time having an upper-bounded limit irrespective of a number of the dictionary words.

16. The method of claim 15 further comprising:

setting the output signal to greater than if the comparison indicates the bit of the input word is greater than the bit of the dictionary word and the output signal is currently indeterminate.

17. The method of claim 16 further comprising:

setting the output signal to less than if the comparison indicates the bit of the input word is less than the bit of the dictionary word and the output signal is currently indeterminate.

18. The method of claim 17 further comprising:

determining if the bit being compared is the least significant bit;

setting the output signal to indicate the input word is equal to the dictionary word when the output signal is currently set to indeterminate, the bit being compared is the least significant bit, and the bit of the input word is equal to the bit of the dictionary word.

19. The method of claim 18 further comprising:

advance to the next bit of the input word and the dictionary word when the current bit is not the least significant bit.

20. The method of claim 15 wherein the upper-bounded limit is proportional to the size of the dictionary entry.

* * * * *